United States Patent Office 3,585,175
Patented June 15, 1971

3,585,175
PROCESS FOR EMULSION POLYMERIZATION OF A MONO-OLEFIN, A VINYL ESTER AND CROTONIC ACID
Albert E. Corey, East Longmeadow, Mass., assignor to Monsanto Company, St. Louis, Mo.
No Drawing. Filed Aug. 27, 1968, Ser. No. 755,714
Int. Cl. C08f 15/40
U.S. Cl. 260—80.8    7 Claims

ABSTRACT OF THE DISCLOSURE

Disclosed herein is an improvement in a process for the emulsion interpolymerization at pressures of less than about 1500 p.s.i. of at least one monoolefin that exists in the gaseous state at 20° C. and one atmosphere pressure and at least one interpolymerizable vinyl ester containing 3–6 carbon atoms, wherein the mole fraction of vinyl ester in the final resin exceeds the mole fraction of monoolefin, wherein the improvement comprises interpolymerizing therewith at least about 0.1 percent by weight, based upon the weight of the polymer, of crotonic acid. An interpolymer of mono-olefin, vinyl ester and crotonic acid is also disclosed.

BACKGROUND OF THE INVENTION

(1) Field of the invention

The present invention relates to interpolymers of gaseous olefins, vinyl esters and crotonic acid and to an emulsion polymerization process for their preparation wherein pressures of less than about 1500 p.s.i. are employed.

(2) Description of the prior art

Copolymers of ethylene and vinyl acetate wherein the vinyl acetate moiety is present as the major component are known in the art. These copolymers are tough and strong and have found use in a wide variety of adhesive and coating applications. There have been, however, certain problems connected with the preparation of these copolymers and certain deficiencies in their physical properties which have prevented or retarded their fullest exploitation in the market place. In particular, the use of a gaseous olefin such as, for example, ethylene or propylene requires that the polymerization be carried out under pressure. Polymerizations of ethylene and vinyl acetate have been performed at pressures of up to about 1500 p.s.i. and often at pressures greatly in excess of this. The need for equipment especially designed to operate under such high pressures and its relatively high cost have prevented a number of manufacturers from entering this field. The high investment required contributes to an increased manufacturing cost which, of course, is reflected in the sales price. Thus, these resins are less competitive than they might otherwise be with other polymers which can be manufactured under less vigorous conditions.

Attempts have been made, with varying degrees of success, to prepare ethylene vinyl acetate copolymers containing major proportions of vinyl acetate under low pressure conditions, i.e., pressures less than 1500 p.s.i. In doing this, a problem of control has arisen where the emulsion polymerization is carried out by batch or semi-batch techniques. Specifically, it is desirable from the point of view of safety and efficiency of ethylene incorporation to maintain the reaction temperature at or below about 40° C. It is at this temperature that conventional cooling means such as cold water reaction vessel jackets and cooling coils are adequate to maintain the desired temperature and reaction rates. If the temperature increases only about five degrees, the reaction becomes so vigorous that the exotherm cannot be reduced by the cooling means. In a commercial size reactor such a situation is decidedly hazardous.

The olefins to be used in the process of this invention are gases at ordinary temperatures and pressures and are dissolved in the vinyl ester monomer, and to a small extent in the aqueous phase, for the reaction. As is the case with most gases, these olefins are more soluble in liquids at lower temperatures, thus maintenance of a relatively low temperature for the reaction improves the solubility of the olefin in the vinyl ester and thereby enhances the efficiency of the reaction.

As has been pointed out above, one of the primary uses of ethylene vinyl acetate copolymers having major proportions of vinyl acetate therein is in the field of adhesives. In many adhesive applications as well as in general plastics applications, resins having a low degree of creep are highly desirable. In general, this is particularly true where the polymer in question is under some kind of exterior applied force, the effect being especially pronounced at elevated temperatures. It is known that creep resistance can be improved by increasing the molecular weight of the particular resin, but in many instances such an increase is very difficult if not impossible to accomplish. A further argument in favor of carrying out the reaction at relatively low temperatures, i.e., at or about 40° C., is that such temperatures also have the beneficial effect of permitting the obtention of increased molecular weights.

The ethylene/vinyl acetate copolymer adhesives of the prior art have been used almost exclusively for low energy surfaces, e.g., polyvinyl chloride, polyesters, polyethylene and the like. It would be highly desirable if the range of potential adherends could be extended to include those of relatively high energy such as aluminum, steel, glass, etc.

Thus, there exists a need for a process for an interpolymerization of gaseous olefins and vinyl esters wherein batch or semi-batch emulsion polymerizations thereof may be controlled to maintain a low reaction temperature and insure thereby maximum ethylene incorporation in the polymer. There is also a need for an interpolymer of this nature which will exhibit improved creep resistance without the need for obtaining very high molecular weights. A need also exists for interpolymers which will exhibit improved adhesion to polar surfaces and at the same time will have satisfactory adhesion to low energy surfaces such as polyvinyl chloride.

SUMMARY OF THE INVENTION

This invention relates to an improvement in a process for the emulsion polymerization of gaseous olefins and vinyl esters at pressures below 1500 p.s.i. where the improvement comprises the incorporation therein of 0.1 to 1.0 percent by weight of crotonic acid.

More particularly, the present invention relates to an improvement in a process for the emulsion interpolymerization at pressures of less than about 1500 p.s.i. of at least one mono-olefin that exists in the gaseous state at 20° C. and one atmosphere pressure and at least one interpolymerizable vinyl ester containing 3–6 carbon atoms, wherein the mole fraction of vinyl ester in the final resin exceeds the mole fraction of mono-olefin, wherein the improvement comprises interpolymerizing therewith at least about 0.1 percent by weight, based upon the weight of the polymer, of crotonic acid.

DESCRIPTION OF THE PREFERRED EMBODIMENTS

The present aqueous emulsions comprise stable small particle size dispersions of individual discrete vinyl ester/ olefin/crotonic acid terpolymer resin particles having an average size of 0.1 to 1.0 micron in diameter and containing at least 1.0 percent of a 70 to 95 percent hydrolyzed ester as the sole protective colloid. The emulsions may be further characterized as possessing emulsion viscosities not exceeding 4000 centipoises for an emulsion containing at least 55 percent total solids. The emulsions can best be characterized by the properties of the air dried films obtained therefrom which possess excellent gloss and clarity. In addition, the films when cast have good quick tack.

The vinyl ester monomers which are useful in the preparation of the polymer emulsions of the present invention can be selected from the general class of polymerizable film forming monoethylenically unsaturated esters of organic acids, said esters having 3–6 carbon atoms therein. Suitable vinyl ester monomers include vinyl formate, vinyl acetate, vinyl propionate, vinyl butyrate, vinyl isobutyrate, and the like.

The mono-olefin comonomers to be used in the practice of this invention exist naturally in the gaseous state at 20° C. at one atmosphere pressure. Such olefins are exemplified by ethylene, propylene, butene-1, butene-2, isobutylene and the like.

Of the above, ethylene and vinyl acetate are the preferred monomers because of their relatively low cost and highly favorable reactivity ratios.

The polyvinyl alcohol protective colloids which are useful in the practice of the present invention are available and may be selected from the general class of hydrolyzed polyvinyl esters. The preparation of suitable polyvinyl alcohols is well known, such as taught in U.S. 2,643,994. The suitable class of polyvinyl alcohol protective colloids may be characterized as water soluble polymers having a residual ester content of approximately 19 percent to 42 percent by weight corresponding to a percent hydrolysis of 95 percent to 70 percent respectively. The molecular weight of the suitable polyvinyl alcohol protective colloids can best be characterized by the viscosity of the 4 percent by weight aqueous solution of polymer which viscosity ranges from 4–45 centipoises at 20° C.

It is especially preferred to utilize the hydrolyzed polyvinyl acetate protective colloid having a viscosity at 20° C. for a 4 percent aqueous solution of the polymer of 4–25 centipoises, a degree of hydrolysis of approximately 87–89 percent and corresponding residual acetate content of 19–23 percent by weight.

Various compounds in the class of free radical initiators may be employed as catalysts for the polymerization reaction. For example, peroxides, such as hydrogen peroxide, lauroyl peroxide, sodium peroxide, potassium peroxide, urea peroxide, acetyl peroxide, oleyl peroxide, and the like. Also, various other per compounds may be used in place of peroxides, such as peracetic acid, sodium perborate, potassium perborate, sodium persulfate and the like. Potassium persulfate is used in the succeeding examples and is particularly preferred.

In conjunction with the above initiators it is essential that a reducing agent activator be employed, thus forming what is commonly referred to as a "redox" system. Activators which are suitable for this purpose are well known in the art and include bisulfites, cerous salts, ferrous salts and the like. Sulfoxylates such as sodium formaldehyde sulfoxylate are especially preferred.

If desired, sodium bicarbonate may be present in the polymerization system. The purpose of this is to offset undesirable acidity in the reaction mixture, but its use is not essential for producing stable fine grain emulsions. In place of the sodium bicarbonate, other alkaline materials may be used if one so desires, as for example, sodium carbonate, potassium carbonate, potassium bicarbonate, sodium hydroxide; water soluble amines, for example, ethylene diamine, quaternary ammonium bases, and the like.

Various emulsifiers may, if desired, be used in addition to the polyvinyl alcohol in the practice of this invention and may be selected from the general class of surfactant materials including anionic, cationic and nonionic types. Particularly useful are sodium and potassium sulfonates of organic compounds containing 10 to 20 carbon atoms such as the sodium salt of dioctyl sulfosuccinic acid. The suitable emulsifying agents are those which are water soluble and non-polymerizable with the vinyl ester monomer or the olefin monomer.

The use of crotonic acid as the third monomer of the interpolymer of this invention is critical. It is known in the art, that adhesion to polar surfaces and improved creep resistance may be attained by the incorporation of small amounts of acrylic acid into the copolymers. This incorporation, however, does not retard the polymerization rate in the manner desired. Other monomers such as maleic acid or itaconic acid totally inhibit the reaction. Thus, although other acids have been tried. it has been found that only crotonic acid imparts to the system all of the desired improvements, i.e., controlled retardation in batch or semi-batch polymerization to maintain low reaction temperature and maximum ethylene incorporation in the polymer, improved adhesion to polar surfaces such as aluminum and improved creep resistance without the need of very high molecular weight. Other agents are known which impart one or two of these properties, but crotonic acid is the only monomer known to contribute all three. In order for significant retardation of the polymerization rate to be obtained, it is necessary that at least about 0.1 percent by weight, based upon the total weight of the polymer, of crotonic acid be used. Since increasing the concentration of the crotonic acid decreases the reaction rate, the actual crotonic acid concentration to be employed is a matter of preference dependent upon the particular reactants used and the properties desired in the final resin. As a practical matter with regard to convenient reaction rates coupled with significant adhesion improvement, an upper limit of 1.0 percent by weight crotonic acid is preferred. Polymerization charges containing from 0.25 to 0.5 percent crotonic acid based on the total polymer weight have been found to yield resins having optimum characteristics of adhesion and creep resistance coupled with controllable reaction rates and are thus the most preferred.

The following examples are presented in illustration of the invention and are not intended in any way to limit the scope thereof. Where parts are mentioned, parts by weight are intended unless otherwise designated.

EXAMPLE 1

Control

To a stainless steel autoclave constructed so as to withstand pressures of the order of 600 p.s.i. and equipped with an agitator and a gas inlet tube is introduced 23.33 parts of water. To this is added 11 parts of a 20 percent aqueous solution of a commercially available polyvinyl alcohol resin containing approximately 20 percent by weight residual polyvinyl acetate. Next are added 0.15 part sodium bicarbonate, 0.204 part sodium formaldehyde sulfoxylate and 34.20 parts of vinyl acetate, in that order. The autoclave is closed and oxygen is removed therefrom by several alternate pressurizations and ventings with ethylene and/or nitrogen. When the oxygen has been evacuated, sufficient ethylene is admitted to the system to raise the pressure inside the autoclave to 475 p.s.i. Agitation is begun and a solution of 0.34 part of potassium sulfate in 11.0 parts of water is slowly pumped in through an entry port over a period of about 3.5 hours. Shortly after the initial addition of the persulfate, the batch temperature begins climbing rapidly and peaks at about 47° C. despite efforts with cooling water to maintain the temperature at the desired 40° C. The reaction rate is thus considered out of control for safety purposes and necessary ethylene solubility. After about 2 hours, the exotherm is complete and a delayed addition of 11.4 parts of vinyl acetate is begun, the addition being carried out over a period of one hour. The batch temperature is maintained at 40° C. for about 1.5 hours after completion of the vinyl acetate delay in order to insure complete polymerization. The pressure of the batch is maintained at 475 p.s.i. throughout the reaction by the addition of ethylene as required. This procedure yields a polymer containing about 88 percent vinyl acetate and 12 percent ethylene by weight.

EXAMPLE 2

Example 1 is repeated except that to the initial charge is added 0.125 weight percent crotonic acid, based upon the weight of the polymer. The total polymer weight is projected from the results of Example 1 on the assumption that a 12/88 E/VA copolymer will be produced. The reaction proceeds as in Example 1 except that this time the temperature peaks at 43° C. While this temperature is still somewhat in excess of the 40° C. level desired, control of the reaction and ethylene concentration in solution is improved.

EXAMPLE 3

Example 2 is repeated except that the crotonic acid concentration in the initial charge is increased to 0.25 percent. This time the exotherm peaks at 40° C. and is easily controlled allowing optimum ethylene solubility and reaction rate.

EXAMPLE 4

Example 2 is repeated using 0.50 percent crotonic acid. Again, as in Example 3, the exotherm peaks at 40° C. The reaction rate is well controlled and the ethylene solubility is optimized.

EXAMPLE 5

Example 2 is repeated except that vinyl butyrate is substituted for the vinyl acetate, isobutylene is substituted for the ethylene and 0.1 percent crotonic acid is used. The reaction rate is slow compared with that of Example 1 and no high exotherm problems are encountered.

EXAMPLE 6

Example 2 is again repeated substituting vinyl propionate for the vinyl acetate, propylene for the ethylene and employing 1.0 percent crotonic acid. Again, the reaction rate is slow compared with that of Example 1 and no high exotherm problems are encountered. The interpolymer shows improved adhesion to high energy surfaces when compared with a similar interpolymer containing no crotonic acid.

EXAMPLE 7

Part A

A 1″ wide polyvinyl chloride sheet is adhered to a 1″ wide piece of maple plywood surface using a commercially available EVA copolymer containing about 15 weight percent ethylene. One end of the PVC strip is left unattached and this tab is inserted into the upper jaws of an INSTRON Tensile Tester. The plywood with PVC attached thereto is fixed to the cross beam of the tensile tester such that the plywood and PVC sheet are at a 90° angle to the tab. The machine is then run at a rate of ½″ per minute thereby peeling the PVC from the plywood at an angle of 90°. The process is then repeated using a strip of aluminum in place of the polyvinyl chloride.

Part B

Part A is repeated except that the EVA Control sample (Example 1) is used in place of the commercial EVA. The force required to peel the strips of the plywood is divided by the force in Part A and the results are reported as a percentage of the peel force of the commercial resin. It is found that EVA of Example 1 exhibits 100% of the peel strength of the commercial EVA for the PVC plywood bond, but only 52% of the commercial value for the aluminum plywood bond.

Part C

Part B is repeated using the terpolymer prepared in Example 4. This time the peel strength for the PVC/maple plywood bond is 122% of that for the commercial EVA and the aluminum/maple peel strength is 100% that of the commercial EVA.

EXAMPLE 8

The emulsions of Examples 1-4 are applied to ½″ wide strips of paper using a doctor blade having a 2.5 mil clearance. Two strips of the coated paper are then joined with a ½″ overlap. When the adhesive is dry the creep resistance of the resin is tested by fixing one of the strips in a vertically hanging clamp and attaching a 5 lb. weight to the other strip. The test is carried out at 60° C. and the time required for separation of the two paper strips is recorded. The creep resistance of the terpolymers of this invention (Examples 2, 3 and 4) is in each case equal to the resistance of the control (Example 1). Further, they are equal in each instance to the commercially acceptable standard.

EXAMPLE 9

The emulsions of Examples 1-4 are individually dissolved in acetone and then precipitated with excess water. They are then washed with boiling water and dried whereupon they are re-dissolved in toluene. As an indication of molecular weight, the viscosity numbers of the four resins are determined. The viscosity number is the specific viscosity divided by the concentration in grams per 100 milliliters. It is found that the control example (Example 1) has a viscosity of 1.49 whereas Examples 2, 3 and 4 have viscosity numbers of 0.93, 0.86 and 0.88, respectively.

Examples 7, 8 and 9 thus demonstrate that the incorporation of crotonic acid improves adhesion to high energy surfaces (aluminum), does not detract from adhesion to low energy surfaces (polyvinyl chloride) and maintains creep resistance at lower molecular weights.

It will be obvious, of course, that the emulsions and resins described herein may be blended with a variety of extenders, plasticizers, pigments, etc. and that many other variations may be made in the products and processes of this invention without departing from the scope thereof.

What is claimed is:

1. In a process for the emulsion interpolymerization at pressures of less than about 1500 p.s.i. of at least one mono-olefin selected from the group consisting of ethylene, propylene, butene-1, butene-2 and isobutylene and at least one interpolymerizable vinyl ester selected from the group consisting of vinyl formate, vinyl acetate, vinyl propionate and vinyl isobutyrate, wherein the mole fraction of vinyl ester in the final resin exceeds the mole fraction of mono-olefin, the improvement which comprises interpolymerizing therewith from about 0.1 to 1.0 percent by weight, based upon the total polymer, of crotonic acid.

2. The process of claim 1 wherein the crotonic acid is present in a concentration of from 0.25 to 0.5 percent by weight, based upon the total polymer.

3. The process of claim 1 wherein the mono-olefin is ethylene.

4. The process of claim 1 wherein the vinyl ester is vinyl acetate.

5. In a process for the emulsion interpolymerization at pressures of less than about 1500 p.s.i. of ethylene and vinyl acetate, wherein the mole fraction of vinyl acetate in the final resin exceeds the mole fraction of ethylene, the improvement which comprises interpolymerizing therewith about 0.1 to about 1.0 percent by weight, based upon the total polymer, of crotonic acid.

6. The process of claim 5 wherein polyvinyl alcohol is used as the sole protective colloid.

7. In a process for the emulsion interpolymerization at pressures of less than about 1500 p.s.i. of ethylene and vinyl acetate, wherein the mole fraction of vinyl acetate in the final resin exceeds the mole fraction of ethylene, and wherein polyvinyl alcohol is used as the protective colloid, the improvement which comprises interpolymerizing therewith about 0.1 to about 1.0 percent by weight, based upon the total polymer, of crotonic acid.

References Cited
UNITED STATES PATENTS

| | | | |
|---|---|---|---|
| 2,263,598 | 11/1941 | Starck et al. | 260—85.7 |
| 2,703,794 | 3/1955 | Roedel | 260—29.6TAUX |
| 2,966,480 | 12/1960 | Wechsler et al. | 260—85.7 |
| 2,996,488 | 8/1961 | Mital et al. | 260—86.7UX |
| 3,196,139 | 7/1965 | Best | 260—86.7X |
| 3,342,765 | 9/1967 | Oosterhof et al. | 260—29.6TAUX |
| 3,404,114 | 10/1968 | Snyder et al. | 260—29.6TA |

JULIUS FROME, Primary Examiner

J. B. LOWE, Assistant Examiner

U.S. Cl. X.R.

260—29.6, 85.7, 86.7